United States Patent [19]
Diner et al.

[11] Patent Number: 5,471,053
[45] Date of Patent: Nov. 28, 1995

[54] LIGHT COLLECTOR

[75] Inventors: Bruce A. Diner, Chadds Ford, Pa.;
Steven Gutteridge, Wilmington, Del.;
Gary L. Peterson, Tucson, Ariz.;
William E. Wolf, Chesapeake City, Md.

[73] Assignee: E. I. Du Pont de Nemours and Company, Wilmington, Del.

[21] Appl. No.: 264,890

[22] Filed: Jun. 24, 1994

[51] Int. Cl.$^6$ .................... G01J 1/00; G01J 1/42
[52] U.S. Cl. .................... 250/228; 250/372; 356/236
[58] Field of Search .................... 250/228, 229, 250/370.07, 372, 372 EM, 472.1, 458.1, 459.1, 461.1; 356/221, 225, 236

[56] References Cited

U.S. PATENT DOCUMENTS

| | | | |
|---|---|---|---|
| 3,180,210 | 4/1965 | Tyler | 88/23 |
| 3,711,722 | 1/1973 | Kavanagh | 250/472.1 |
| 4,178,101 | 12/1979 | Booth | 356/221 |
| 4,804,849 | 2/1989 | Booth et al. | 250/459 |
| 4,853,542 | 8/1989 | Milosevic et al. | 250/372 |
| 4,939,376 | 7/1990 | Woodruff et al. | 250/228 |
| 4,985,632 | 1/1991 | Bianco et al. | 250/372 EM |
| 5,008,548 | 1/1991 | Gat | 250/372 EM |
| 5,036,311 | 7/1991 | Moran et al. | 250/372 EM |
| 5,081,362 | 1/1992 | Vargo | 250/472.1 |
| 5,173,609 | 12/1992 | Lacoste et al. | 250/370.07 |

OTHER PUBLICATIONS

Sasaki et al., *A 4II–Underwater Irradiance Meter*, J. of the Oceanographical Society of Japan, vol. 22, No. 4, Aug. 1966, pp. 1–6.
Maddux, *A 4II Light Meter*, Limnology and Oceanography, 1966, pp. 136–137.
Rich et al., *A Simple Sensitive Underwater Photometer*, Limnology and Oceanography, 1969, pp. 611–613.
*SPSE Handbook of Photographic Science and Engineering*, John Wiley & Sons, 1973, pp. 856–857, 1142–1143.

Primary Examiner—Edward P. Westin
Assistant Examiner—Steven L. Nichols

[57] ABSTRACT

A light collector for use with a photodetector that provides uniform photodetector output response over a polar angular range regardless of the polar angle of incidence of light upon the collector is disclosed. The light collector comprises a generally spheroidally-shaped light direction changer having a light diffusing surface, and a generally spheroidally-shaped polar attenuator. The geometric center of the photosensitive surface of the photodetector is adjacent to the vertex of the generally spheroidal-shaped light direction changer.

17 Claims, 4 Drawing Sheets

LIGHT COLLECTOR

BACKGROUND OF THE INVENTION

1. Field of the Invention

The present invention relates to a light collector adaptable for use with a generally planar photodetector to provide a uniform photodetector output response over a predetermined polar angle range regardless of the polar angle of incidence of light upon the collector.

2. Description of the Prior Art

Personal sun exposure measurement devices, or so-called UV personal dosimeters, utilize a planar photodetector which generates an output response signal in accordance with the magnitude of the radiation incident thereon. Since the output response signal of the photodetector varies as a function of the angle of incidence of the illuminating light, these devices will not provide the desired measurement accuracy unless they are properly oriented with respect to the source of the incident radiation. Thus it is necessary to provide a suitable aiming mechanism which maintains the photodetector in the most optimal relationship with respect to the sun to insure that the maximum intensity of the UV-radiation is detected. The aiming mechanism may take a variety of forms.

U.S. Pat. No. 5,036,311 (Moran et al.) exemplifies a UV dosimeter that measures incident solar UV radiation in a weighted manner corresponding to the erythemal action spectrum of human skin. The dosimeter of the Moran patent includes an analog indicator that permits a user to align the photodetector to the sun so that the angle of incident radiation lies within the broad range (approximately plus/minus forty five degrees) over which the dosimeter is accurate. The dosimeter device disclosed in U.S. Pat. No. 5,008,548 (Gat), which is in a form similar to a pocketwatch, includes an accessory stand for properly orienting the dosimeter with respect to the incident radiation. The dosimeter disclosed in U.S. Pat. No. 4,985,632 (Bianco et al.) takes the form of a wristwatch designed to be worn by the user.

However, when such devices are properly positioned to receive direct solar radiation they will typically not be positioned to detect radiation that is reflected or scattered from snow, water or soil surfaces, as might be experienced by a person when skiing, swimming, boating or reclining on a sandy beach.

It is, therefore, believed advantageous to provide a light collector for use with a photodetector that provides a uniform output response from the photodetector over a range of polar incidence angles exceeding 180 degrees. More preferably, it is believed advantageous to provide a light collector that provides a uniform output response from the photodetector over a polar angular range of at least two hundred seventy degrees.

Other radiation measurement devices are known to the art.

U.S. Pat. No. 4,178,101 (Booth) and U.S. Pat. No. 4,804,849 (Booth et al.) both disclose a spherical collector with an outer translucent surface. A light pipe extends from the center of the sphere to transmit collected light to a remotely located photodetector. Each reference also discloses a filter assembly between the end of the light pipe and the photodetector to achieve the desired spectral response.

U.S. Pat. No. 3,180,210 (Tyler) also discloses a hollow spherical collector with an outer translucent surface. The sphere has an opening therein through which collected light exits the sphere via a tubular extension and is-transmitted to a remotely located photodetector.

The article by W. S. Maddux, "A 4-Π Light Meter", *Limnology and Oceanography*, 1966, 2, 136–37, shows an elongated photodetector assembly positioned at the center of a solid sphere of a light scattering plastic foam material (polystyrene).

The article by Sasaki et al., "A 4-Π Underwater Irradiance Meter", *Journal of the Oceanographical Society of Japan*, Volume 22, Number 4, August 1962, discloses a pair of photodetectors, each with an opal window of hemispherical form, that imparts a polar angular response that is improved over that of a photodetector having a planar opal window.

The article by Rich and Wetsel, "A Simple Sensitive Underwater Photometer" *Limnology and Oceanography*, 1969, 14, 611–13, shows the use of a hemispherically-shaped foam member as a light scattering element in combination with a planar opal glass light scattering element disposed immediately in front of a photocell.

*SPSE Handbook of Photographic Science and Engineering*, Woodlief Thomas, Jr., Editor, published by John Wiley and Sons (1973), at pages 856–57 discloses a densitometer using an integrating sphere. Pages 1142–43 of the same text shows a light meter having a hemispherical translucent dome.

SUMMARY OF THE INVENTION

The present invention is directed to a light collector for use with a photodetector having a photosensitive surface. The photosensitive surface of the photodetector has a geometric center. The photodetector has a predetermined output response that is functionally related to the polar angle of incidence of light thereon.

The light collector comprises a generally spheroidally-shaped light direction changer having a light diffusing surface and a generally spheroidally-shaped polar attenuator. The generally spheroidally-shaped light direction changer has an axis of revolution with a vertex lying on the axis of revolution. The geometric center of the photosensitive surface of the photodetector is adjacent to the vertex of the generally spheroidally-shaped light direction changer.

The light direction changer and the polar attenuator cooperate to collect light over the predetermined polar angular range and to direct collected light toward the photodetector. When associated with the light collector the photodetector generates a uniform output response over the polar angular range regardless of the polar angle of incidence of light upon the collector.

In a first embodiment of the light collector both the light direction changer and the polar attenuator are physically embodied in the same hollow spheroid formed of a material substantially translucent to light.

In a second embodiment of the light collector the spheroid that embodies both the light direction changer and the polar attenuator has a thickness dimension which varies over the predetermined polar angular range. The variation in thickness dimension of the spheroid attenuates light incident on the collector in accordance with a predetermined polar attenuation function.

In accordance with a third embodiment of the light collector the light direction changer and the polar attenuator are again both physically embodied in the same spheroid. The spheroid presents a substantially opaque appearance when viewed from its exterior. The spheroid has a spaced array of regions of different light attenuating ability and a diffusely reflective surface. The diffusely reflective surface, which defines the light diffusing surface of the light direction changer, faces toward the center of the spheroid. The spheroid may be formed from a transparent material, in which case the opacity of the exterior appearance of the spheroid is defined by a coating of an opaque diffusely reflective material. The regions of different light attenuating ability may be defined by apertures in the coating. The regions are arranged to prevent entering light from impinging directly on the photodetector or from exiting from the light collector directly through another region. Thus, in accordance with this embodiment of the invention no two regions of different light attenuating ability may be diametrically opposed. If desired, a lens may be disposed in each of the apertures in the coating. Each lens has a focal length that is preferably substantially less than the diametric dimension of the spheroid.

In accordance with a fourth embodiment, the light collector comprises an outer spheroid and a concentric, inner, spheroidally-shaped light baffling surface. The outer spheroid presents a substantially opaque appearance when viewed from its exterior, has an inwardly-facing reflective surface, and has an array of spaced regions of different light attenuating ability. The outer spheroid may be formed from a transparent material with the opacity of the outer spheroid being defined by a coating of an opaque material. The concentric, inner, spheroidally-shaped light baffling surface is diffusely reflective and is confrontationally arranged with respect to the inwardly-facing reflective surface of the outer spheroid. The diffusely reflective light baffling surface defines the light diffusing surface of the light direction changer. The diffusely reflective light baffling surface may be defined by a coating of diffusely reflective material. The inwardly-facing reflective surface of the outer spheroid and the diffusely reflective light baffling surface cooperate to define the light direction changer. The arrangement of the regions of different light attenuating ability in the spheroid defines the polar attenuator. The regions of different light attenuating ability are typically, but not necessarily, nonuniformly spaced in the polar direction.

If the light collector in accordance with any embodiment of the present invention is used to implement a personal dosimeter a wavelength passband filter element may be used to achieve the desired spectral sensitivity of the photodetector.

BRIEF DESCRIPTION OF THE DRAWINGS

The invention will be more fully understood from the following detailed description, taken in connection with the accompanying drawings, in which.

DETAILED DESCRIPTION OF THE INVENTION

Throughout the following detailed description similar reference characters refer to similar elements in all Figures of the drawings.

The present invention is directed to a light collector, generally indicated in the Figures by the reference character 10, for use with a photodetector 12. The photodetector 12 has a photosensitive surface 12S having a geometric center 12C. The photodetector 12 responds to light incident thereon by producing an electrical output response signal. The amplitude of the output response signal of the photodetector 12 is functionally related to the polar angle of incidence of light on the photodetector. By "polar angle" it is meant that angle Θ measured from a pole P of a polar coordinate system erected at an origin located at the geometric center 12C and extending perpendicularly to the surface 12S of the photodetector 12.

The light collector 10 comprises a generally spheroidally-shaped light direction changer generally indicated by the reference character 20 and a generally spheroidally-shaped polar attenuator generally indicated by the reference character 24. The light direction changer 20 has a light diffusing surface generally indicated by the reference character 20S. The axis of revolution of the light direction changer 20 and the axis of revolution of the polar attenuator 24 are collinear and are respectively indicated by the characters 20A and 24A. These axes are each coincident with the overall axis 10A of the light collector 10. In the preferred instance the axis 10A is collinear with the pole P. "Polar attenuator" (or any variant thereof) as used herein means a functional element (or function) that causes or results in light incident on the light collector 10 being attenuated as a function of the polar angle Θ of incidence thereon.

Figure 1:
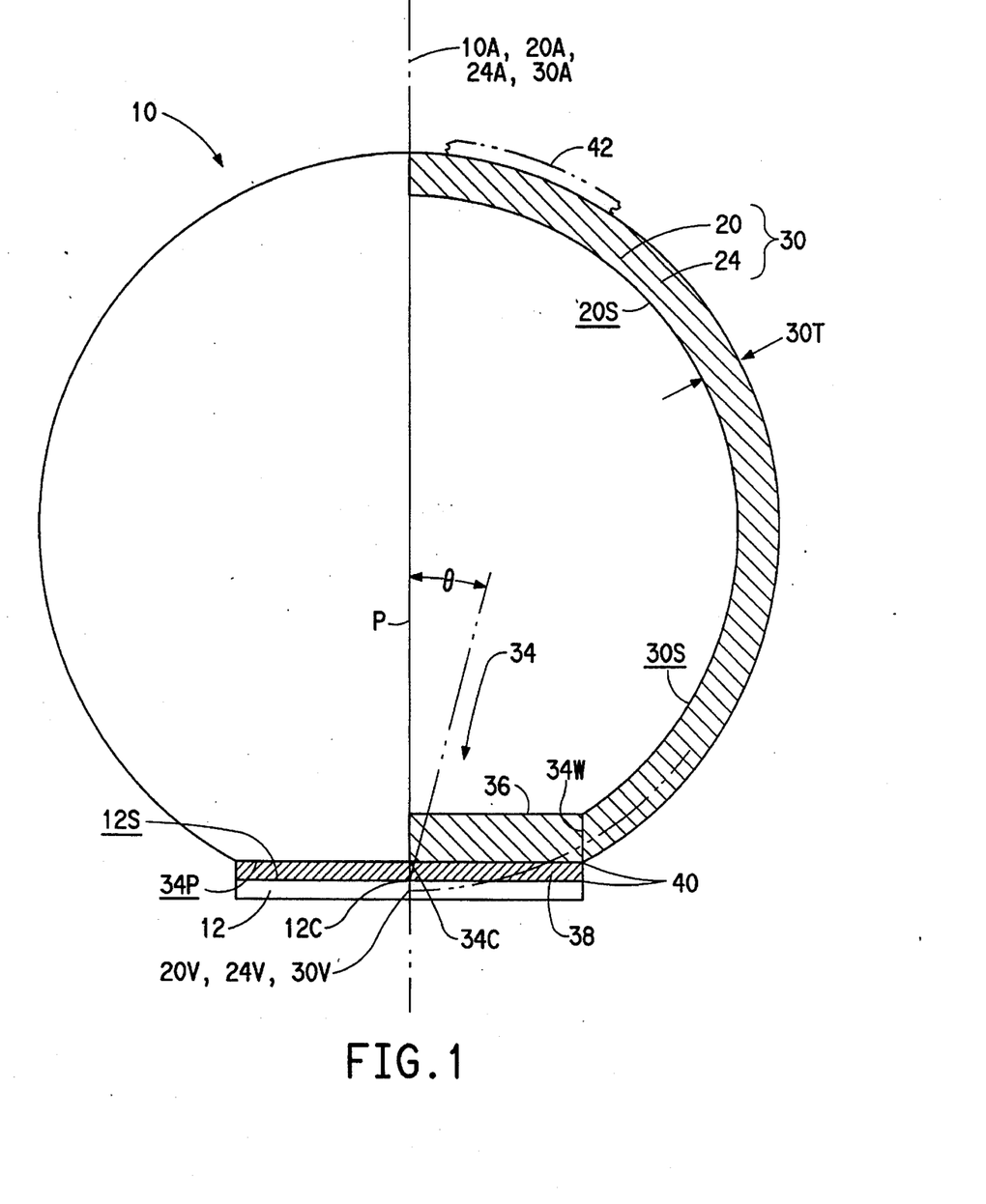
FIG. 1 is an elevational view, in half-section, illustrating the light collector in accordance with the first embodiment of the present invention.
Figure 2:
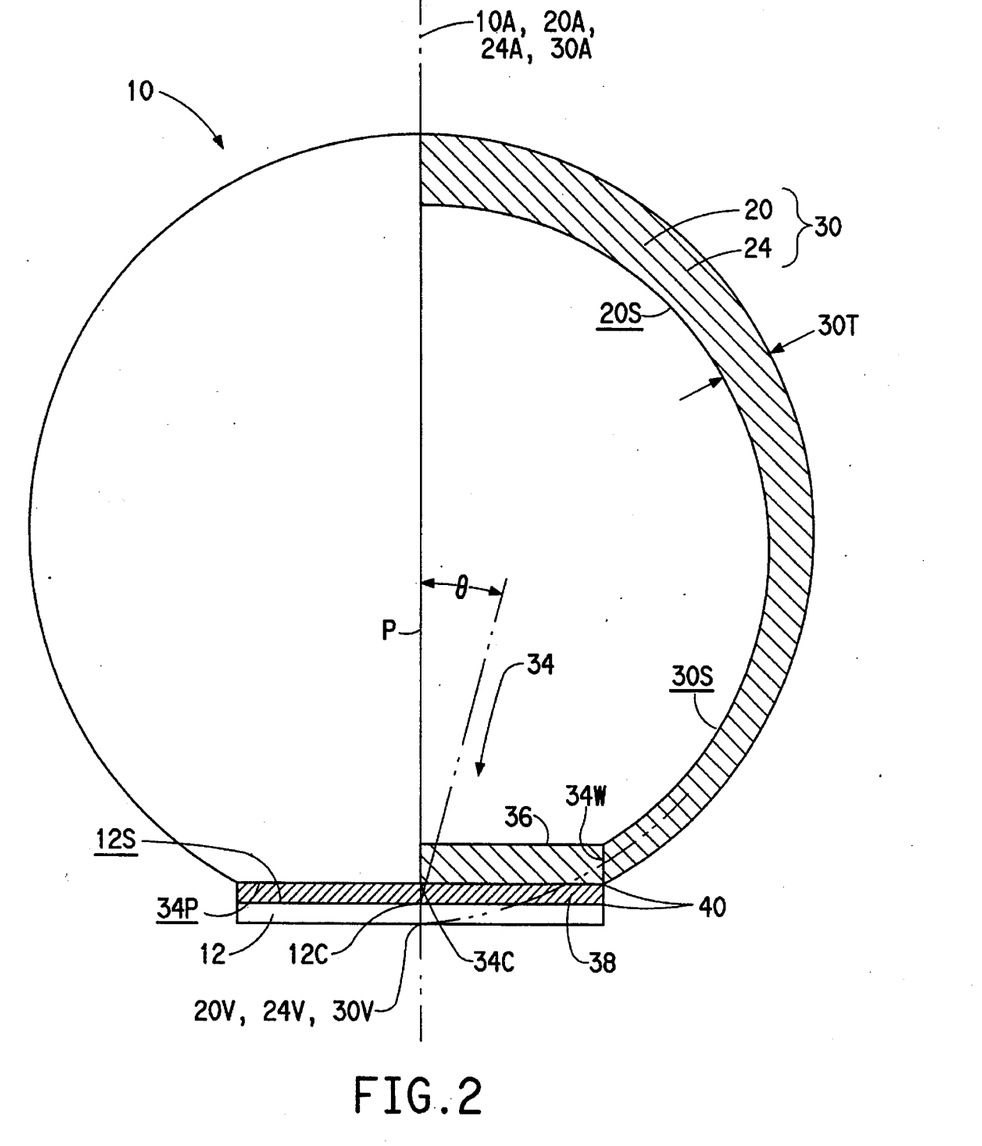
FIG. 2 is an elevational view in half-section, illustrating a second embodiment of the present invention.
Figure 3:
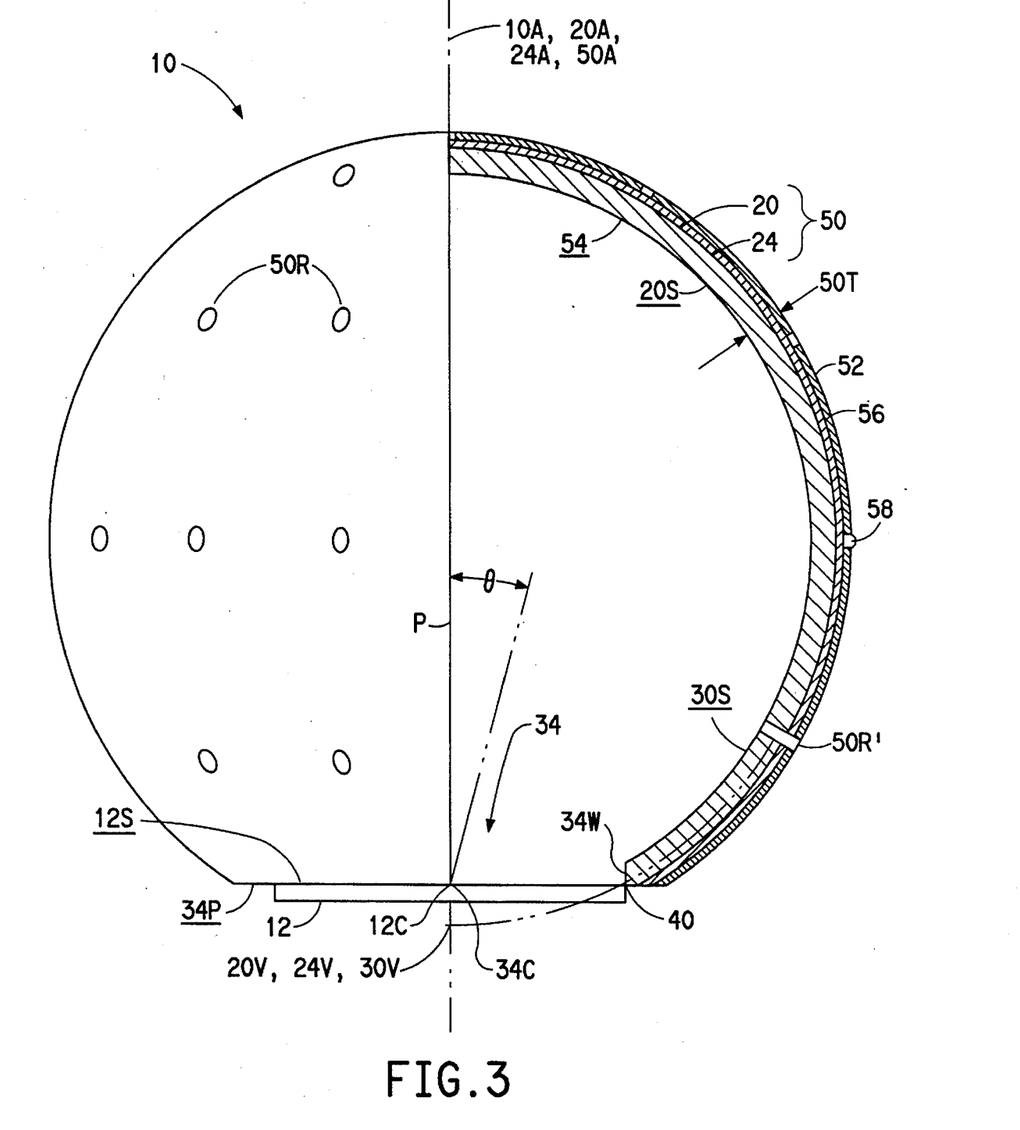
FIG. 3 is an elevational view, in half section, illustrating the light collector in accordance with a third embodiment of the present invention.
Figure 4:
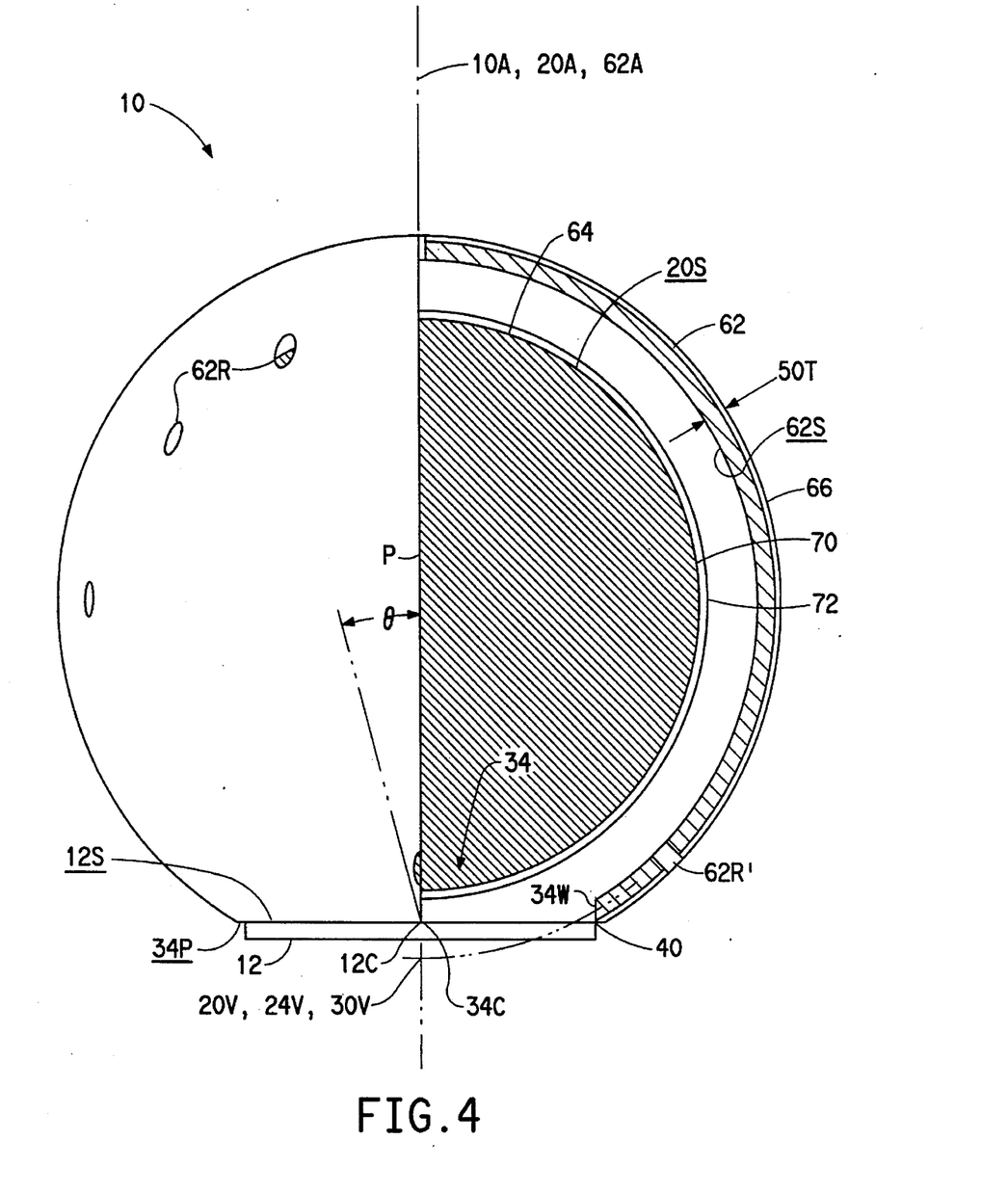
FIG. 4 is an elevational view, in half section, illustrating the light collector in accordance with a fourth embodiment of the present invention.

Throughout the description of the present invention the compound adjective "spheroidally-shaped" is used to describe generally the outer shape of light direction changer 20 and of the polar attenuator 24 that comprise the light collector 10. A "spheroid" is a geometric body of revolution, i.e., an ellipse revolved about one of its axes. If the ellipse is revolved about its minor axis an oblate spheroid is defined. In FIG. 3 both the light direction changer 20 and the polar attenuator 24 are illustrated as oblate spheroids. If the ellipse is revolved about its major axis a prolate spheroid is defined. FIG. 2 illustrates both the light direction changer 20 and the polar attenuator 24 as prolate spheroids. If the ellipse takes the form of a circle (the major and minor axes being equal) a sphere is defined. In FIGS. 1 and 4 both the light direction changer 20 and the polar attenuator 24 are illustrated as spherical.

Every spheroidally-shaped member has a first and a second vertex associated therewith. Each vertex is mathematically defined as that point at which the axis of revolution of the spheroid intersects the surface thereof. Accordingly, the generally spheroidally-shaped light direction changer 20 has a pair of vertices, one of which (the lower vertex owing to the orientation of Figures) is indicated by the character 20V. Similarly, the generally spheroidally-shaped polar attenuator 24 also has a pair of vertices, with the lower vertex being indicated by the character 24V. In accordance with the present invention the geometric center 12C of the photosensitive surface 12S of the photodetector 12 lies adjacent to the lower vertex 20V of the light direction changer 20.

The light direction changer 20 and the polar attenuator 24 cooperate to collect light over a predetermined polar angular range and to direct collected light toward the photodetector 12. When associated with the light collector 10 the photodetector 12 generates a uniform output response over the polar angular range regardless of the polar angle of incidence of light upon the collector 10. In the context of the present invention an output response that varies from the mean by up to about forty percent (40%) is to be construed as being sufficiently "uniform". In accordance with this invention the polar angular range is, preferably, at least two hundred seventy degrees.

As will be readily appreciated, small deviations in the shape of the light direction changer 20 and/or of the polar attenuator 24 will have only a minimal effect on the optical performance of the light collector 10. Accordingly, an ellipsoid (i.e., a geometric body in which any cross section is an ellipse) which approximates the shape of a spheroid but which is not a body of revolution, or any approximation of a spheroid having a plurality of planar surfaces such as is commonly referred to as a "geodesic dome", may achieve comparable optical performance. These alternatives are to be considered within the meaning of the term "spheroidally-shaped" as used to describe the present invention.

The invention may be realized in several different embodiments.

FIG. 1 shows a light collector 10 in accordance with a first embodiment of the present invention. In this embodiment both the light direction changer 20 and the polar attenuator 24 are physically realized in a single spheroid 30 having an axis 30A (collinear with the axes 10A, 20A, 24A and the pole P). As seen in FIG. 1 the spheroid 30 is realized as a hollow shell fabricated of a material that is substantially translucent to light. By "translucent" it is meant that light passing through the material is isotropically diffused. The interior surface of the shell is indicated by the reference character 30S. Any suitable material having the requisite optical translucence, such as the material sold by Labsphere, Inc., North Sutton, N.H. under the trademark "Spectralon®", may be used. The hollow interior of the spheroid 30 may, if desired, be filled with a suitable transparent material. The shell has a predetermined uniform thickness dimension 30T.

In the embodiment illustrated in FIG. 1 the spheroid 30 is truncated to define a physical opening 34 having a boundary wall 34W. The boundary wall 34W is radially symmetric to the axis 30A. The exterior of the spheroid 30 in the vicinity of the truncation is planar as indicated at 34P. The geometric center 34C of the opening 34 is adjacent to the lower vertex 30V. The photodetector 12 is received against the planar surface 34P thereby to dispose the geometric center 12C of the photosensitive surface 12S of the photodetector 12 on the axis 30A adjacent to the lower vertex 30V of the spheroid 30.

Optionally, a wavelength passband filter 38 may be disposed in the opening 34 with the lateral edges of the filter 38 engaged against the boundary wall 34W. Such a wavelength passband filter is recognized as having a directional sensitivity to light. Accordingly an additional element should be provided that minimizes or eliminates this directional sensitivity. Preferably this additional element takes the form of a diffusing plate 36. The diffusing plate 36 is disposed radially inwardly of and directly against the wavelength passband filter 38. The optical characteristics of the diffusing plate 36 are preferably similar to those of the spheroid 30. Depending upon convenience the wavelength passband filter 38 and the associated diffusing plate 36 may be physically mounted against the planar surface 34P or against the boundary wall 34W of the opening 34.

To minimize reflection losses a thin layer of refractive index matching material (indicated by the line 40) may be provided between the photosensitive surface 12S of the photodetector 12 and the surface of the element adjacent thereto, (i.e., either the wavelength passband filter 38 or the diffusing plate 36, as the case may be). A thin layer of the refractive index matching material should also be disposed between adjacent surfaces of the wavelength passband filter 38 and the diffusing plate 36. Any suitable index matching material may be used.

In the embodiment shown in FIG. 1 (uniform thickness translucent shell) the light direction changing function and the polar attenuation function respectively performed by the light direction changer and the polar attenuator are interrelated. Owing to the translucence of the shell light scatters and diffuses as it passes through the shell from the exterior to the interior thereof, and light within the shell diffusely reflects from the inner surface 30S. Thus, both the light direction changing function of the generally spheroidally-shaped light direction changer 20 and the polar attenuation function of the generally spheroidally-shaped polar attenuator 24 are effected.

Polar attenuation of a uniformly thick shell may be enhanced by adding a coating 42 of a material whose optical density is a function of the polar angle onto at least a portion of the outer surface of the spheroid 30. In FIG. 1 the coating 42 is indicated by dot/dash lines extending over a portion of the crown of the spheroid 30. It is to be noted that the wavelength passband filter 38 may alternately take the form of a coating on the outer surface of the spheroid (either above or below the coating 42, if the same is provided.) Alternatively the translucency of the shell may be varied with polar angle by variably loading the material of the shell with an amount of light scattering material.

The first embodiment of the present may be exemplified for better understanding by the following example.

EXAMPLE 1

Hollow Spheroid With Lambertian Scattering Character

A white material, sold by Labsphere, Inc. under the trademark Spectralon offers highly diffuse reflectance. The scattering characteristics of this material are substantially Lambertian, i.e., substantially translucent to light. A one millimeter (1 mm) thickness of this material reflects about ninety-four percent (94%) of the incident light, transmits about five percent (5%) and absorbs about one percent (1%). A hollow sphere formed of this material would pass five percent (5%) of the incident illumination, at a wavelength of about three hundred nanometers (300 nm), through the shell and into the hollow interior thereof. The light captured within the shell is internally reflected and diffused. Some of the diffused light will be intercepted directly by the photodetector. The remainder of the light propagates to the inner surface of the sphere where it is repeatedly rescattered uniformly throughout the sphere. Some of the rescattered light is intercepted by the photodetector and the remainder is again rescattered. Thus, the power of the light intercepted by the photodetector, either directly or indirectly, is independent of incident direction to the sphere.

A planar photodetector at the vertex of the sphere would respond uniformly to the captured light irrespective of the original angle of incidence upon the shell. A sphere constructed with one millimeter thickness would have sufficient mechanical rigidity for use with a personal dosimeter and have the desired light transmission and reflection properties. As previously discussed in connection with FIG. 1, a wavelength passband filter may be optionally incorporated in the form of an additional concentric outer sphere or in the form of a planar filter immediately in front of the photosensitive surface of the photodetector.

The second embodiment of the invention as shown in FIG. 2 illustrates yet another alternative whereby polar attenuation of the spheroid may be enhanced. The light collector 10 shown in FIG. 2 is similar to that of FIG. 1 with the exception that the thickness dimension 30T of the spheroid 30 is varied in accordance with polar angle.

FIG. 3 illustrates a third embodiment of the present invention in which the light direction changer 20 and the polar attenuator 24 are again both physically embodied in the same spheroid. In FIG. 3 the spheroid is indicated by the reference character 50. When viewed from its exterior the spheroid 50 presents a substantially opaque appearance. The spheroid 50 has a spaced array of regions 50R of different light attenuating ability formed therein. By "different light attenuating ability" it is meant that the regions 50R are not opaque. The regions 50R of different light attenuating ability may be either uniformly or nonuniformly sized and/or either uniformly or nonuniformly arranged in the polar direction. Preferably, in accordance with this embodiment of the invention the regions 50R of different light attenuating ability are arranged to prevent entering light from impinging directly on the photodetector or from exiting from the light collector directly through another region. Thus, in one way to achieve this end in accordance with this embodiment of the invention, no two regions of different light attenuating ability are diametrically opposed. As is discussed hereinafter, other expedients to achieve this end may also be provided.

As illustrated in FIG. 3 the outer spheroid 50 may be formed from a shell of transparent material with the opacity of its exterior appearance being defined by a coating 52 of an opaque material. In FIG. 3 the opaque coating 52 is disposed on the outer surface of the spheroid 50, although it may be disposed on the interior surface if desired.

The regions 50R of different light attenuating ability may be implemented either by providing physical openings through the opaque coating 52 and through the spheroid 50 itself, or by providing physical openings or optical apertures in only the opaque coating 52. Alternatively, the spheroid 50 may be formed from a shell of opaque material with the regions 50R being implemented by providing physical openings extending through the spheroid 50.

The spheroid 50 has a diffusely reflective surface 54 which defines the light diffusing surface of the light direction changer 20. Whatever the manner chosen to impart the opaque exterior appearance of the spheroid 50, the diffusely reflective surface 54 is correspondingly arranged so that the diffusely reflective surface 54 faces inwardly toward the interior of the spheroid 50. In the embodiment illustrated in FIG. 3 (shell of transparent material) the diffusely reflective surface 54 is provided by a second coating 56 also located on the exterior of the spheroid 50 but radially inward of the opaque coating 52. If desired the coating 56 and the opaque coating 52 may be disposed on the interior surface of the spheroid 50. The coating 56 that forms the diffusely reflective surface 54 must, in all cases, be radially inward of the opaque coating 52. If the regions 50R of different light attenuating ability are provided by physical openings, such openings need not necessarily extend through the coating 56, so long as the coating 56 is not opaque. This condition is illustrated in FIG. 3.

As noted it is important that no rays of light entering the spheroid impinge directly on the photodetector or directly exit through another region of different light attenuating ability. This may be accomplished in at least two additional ways. Firstly, if the spheroid is formed from an opaque material the diameter of the openings that define the regions 50R is small as compared to the thickness 50T of the spheroid so that no direct path exists from the exterior of the spheroid to the photodetector 12. One such appropriately sized opening 50R' is shown in FIG. 3.

Alternatively, some or all of the regions 50R may have a refractive or diffusive element (e.g., a refractive lens) 58 disposed therein. Only one lens 58 is shown in FIG. 3 for clarity of illustration. Each lens 58 has a focal length that is less than, and preferably substantially less than, the diametric dimension of the spheroid 50. For example, a focal length on the order of one-half the diameter of the spheroid 50 may be used. The focusing action of the lens 58 insures that light entering the spheroid is dispersed to illuminate a relatively large area of the diffusely reflective interior surface of the spheroid.

In the illustrated embodiment of FIG. 3 the light direction changing function and the polar attenuation function are interrelated, although the light direction changing function is primarily effected by the inwardly facing diffusely reflective surface 54. The polar attenuation function is primarily effected by the spaced array of regions 50R of different light attenuating ability. It is noted that the presence of the diffusely reflective surface 54 might make unnecessary the provision of the diffusing plate 36 in the embodiment of FIG. 3.

FIG. 4 shows a light collector 10 in accordance with a fourth embodiment of *the present invention. In-this embodiment the light collector 10 comprises an outer spheroid 62 and a concentric, inner, spheroidally-shaped light baffling surface 64.

The outer spheroid 62 presents an exterior appearance that is substantially opaque, has an array of spaced regions 62R of different light attenuating ability, and has an inwardly-facing reflective surface 62S. The inwardly-facing reflective surface 62S may be either specularly or diffusely reflective. The regions 62R of different light attenuating ability are typically, but not necessarily, nonuniformly spaced in the polar direction.

The concentric, inner, spheroidally-shaped light baffling surface 64 is diffusely reflective. The diffusely reflective light baffling surface 64 is confrontationally arranged with respect to the inwardly-facing reflective surface 62S of the outer spheroid 62. The diffusely reflective light baffling surface 64 defines the light diffusing surface 20S of the light direction changer 20. In this embodiment the inwardly-facing reflective surface 62S of the outer spheroid 62 and the diffusely reflective light baffling surface 64 cooperate to effect the light direction changing function. The arrangement of the regions 62R of different light attenuating ability in the spheroid 62 effects the polar attenuation function for this embodiment. As is discussed in connection with FIG. 3, an optional wavelength passband filter 36 and associated diffusing plate 38 may be used.

The embodiment of FIG. 4 may be structurally realized in a variety of ways. For example, the outer spheroid 62 may be formed as a shell of transparent material. The opacity of the appearance of the outer spheroid 62 may be defined by disposing a coating 66 of an opaque material on the exterior surface of the shell. An inner spheroidally-shaped baffle member 70 is supported within the outer spheroid 62. The diffusely reflective light baffling surface 64 may be realized by disposing a coating 72 of a diffusely reflective material on the exterior of the baffle member 70. Similar to the embodiment of FIG. 3 the regions 62R of different light attenuating ability may be implemented either by providing physical openings in the outer spheroid 62 itself, or by providing physical openings or optical apertures in the coating 66.

Alternatively, instead of providing a physically separate baffle member 70 the diffusely reflective light baffling surface may be realized as a coating 72 diffusely reflective material on the interior surface of the spheroid 62. The regions 62R of different light attenuating ability may be formed in either manner discussed above so long as an inwardly reflective surface 62S is provided.

The fourth embodiment of the present may be exemplified for better understanding by the following example.

EXAMPLE 2

An Integrating Spheroid With Diffusely Reflective Baffle

A hollow spherical shell coated on the inside with a reflective material and having within a second sphere with a diameter of about 0.75 of the diameter of the outer sphere. Both the inner surface of the outer sphere and the outer surface of the inner sphere have a coating of diffusely reflective barium sulphate having a reflection efficiency of 0.955 at the three hundred nanometer (300 nm) wavelength. Light enters through apertures in the outer shell and is diffusely reflected in the space between the spheres. A planar photodetector positioned on the inner surface of the outer sphere and having an area of less than one percent of the surface detects this diffuse radiation. The photodetector is rendered insensitive to the angle of incidence of the light on the collector by positioning and sizing of the apertures in the outer sphere. The outer sphere has of radius twenty millimeters (20 mm) and thickness of a half millimeter (0.5 mm) and inner sphere of radius fifteen millimeters (15 mm). A single circular aperture of one millimeter (1 mm) diameter is positioned at the polar angle Θ of zero degrees (0°), and a group of four circular apertures of one millimeter (1 mm) diameter is positioned at each polar angle Θ of forty-five degrees (45°), sixty-seven and one-half degrees (67.5°), ninety degrees (90°) and one hundred thirty five degrees (135°). The apertures of each group are uniformly distributed in azimuth, i.e., longitudinal, angle, with each aperture in a group being ninety degrees (90°) apart. Each group is displaced twenty-two and one-half degrees (22.5°) in azimuth angle from the adjacent group.

A computer model simulation of such an arrangement using a Monte Carlo Analysis by Breault Research Organization, Inc., Tucson, Ariz., indicates a substantially uniform response of the photodetector results. The response of the photodetector is uniform to within twenty percent (20%) of the mean over the solid angle of interest. To ensure the photodetector is only sensitive to those wavelengths of interest, a wavelength passband filter may be positioned over the regions of transparency at the outer sphere. As previously discussed in connection with FIG. 1 the wavelength passband filter may alternatively be disposed immediately in front of the photosensitive surface of the photodetector.

Those skilled in the art, having the benefit of the teachings of the present invention as set forth, may effect numerous modifications thereto. Such modifications are to be construed as lying within the contemplation of the present invention, as defined by the appended claims.

What is claimed is:

1. A light collector for use with a photodetector having a photosensitive surface, the photosensitive surface of the photodetector having a geometric center, the photodetector having a predetermined output response that is functionally related to the polar angle of incidence of light thereon, the light collector comprising:
a generally spheroidally-shaped light direction changer having a light diffusing surface; and
a generally spheroidally-shaped polar attenuator,
the generally spheroidally-shaped light direction changer having an axis of revolution and having a vertex lying on the axis of revolution,
the geometric center of the photosensitive surface of the photodetector being adjacent to the vertex of the generally spheroidally-shaped light direction changer,
the light direction changer and the polar attenuator cooperating to collect light over a predetermined polar angular range and to direct collected light toward a photodetector,
so that, when associated with the light collector, the photodetector generates a uniform output response over the polar angular range regardless of the polar angle of incidence of light upon the collector.

2. The light collector of claim 1 wherein the direction changer and the polar attenuator are physically embodied in a hollow spheroid formed of a material substantially translucent to light.

3. The light collector of claim 2 wherein the spheroid has an opening therein, the opening having a geometric center, the geometric center of the opening lying on the axis of revolution of the spheroid.

4. The light collector of claim I wherein the light collector is physically embodied in a hollow spheroid formed of a material substantially translucent to light, the spheroid having a thickness dimension which varies over the predetermined polar angular range, the variation in thickness dimension of the spheroid attenuating light incident on the collector in accordance with a predetermined polar attenuation function.

5. The light collector of claim 1 wherein the direction changer and the polar attenuator are physically embodied in a spheroid having a center, the spheroid presenting a substantially opaque appearance when viewed from its exterior, the spheroid having a spaced array of regions of different light attenuating ability,
the spheroid having a diffusely reflective surface thereon, the diffusely reflective surface facing toward the center of the spheroid,
the diffusely reflective surface of the spheroid defining the light diffusing surface on the light direction changer.

6. The light collector of claim 5 wherein the spheroid is formed from a transparent material, the opacity of the exterior appearance of the spheroid being defined by a coating of diffusely reflective material.

7. The light collector of claim 6 wherein the regions of different light attenuating ability are defined by apertures in the coating.

8. The light collector of claim 5 wherein the regions of different light attenuating ability are arranged to prevent light entering one region from directly exiting from the light collector through another region.

9. The light collector of claim 7 wherein the spheroid has a predetermined diametric dimension associated therewith, the light collector further comprising a lens disposed in each of the apertures in the coating, each lens having a focal length that is less than the diametric dimension of the spheroid.

10. The light collector of claim 5 wherein the regions of different light attenuating ability prevent entering light from impinging directly on the photodetector.

11. The light collector of claim 1 comprising:

an outer spheroid and a concentric, inner, spheroidally-shaped light baffling surface, the outer spheroid presenting a substantially opaque appearance when viewed from its exterior, having an inwardly-facing reflective surface, and having an array of spaced regions of different light attenuating ability, the concentric, inner, spheroidally-shaped light baffling surface being diffusely reflective and being confrontationally arranged with respect to the inwardly-facing reflective surface of the outer spheroid, the diffusely reflective light baffling surface defining the light diffusing surface of the light direction changer, wherein the inwardly-facing reflective surface of the outer spheroid and the diffusely reflective light baffling surface cooperate to define the light direction changer, and wherein the arrangement of the regions of different light attenuating ability in the spheroid defines the polar attenuator.

12. The light collector of claim 11 wherein the diffusely reflective light baffling surface is defined by a coating of a diffusely reflecting material.

13. The light collector of claim 11 wherein the opacity of the exterior appearance of the spheroid is defined by a coating of opaque material.

14. The light collector of claim 11 wherein the regions of different light attenuating ability are nonuniformly spaced in the polar direction.

15. The light collector of claim 11 wherein the regions of different light attenuating ability are uniformly spaced in the polar direction.

16. The light collector of claim 11 wherein the regions of different light attenuating ability prevent entering light from impinging directly on the photodetector.

17. The light collector of claim 11 wherein the regions of different light attenuating ability diffuse entering light.

* * * * *